United States Patent
Wang et al.

(10) Patent No.: US 8,139,159 B2
(45) Date of Patent: Mar. 20, 2012

(54) SINGLE DOWN-CONVERSION TELEVISION TUNER

(75) Inventors: Fucheng Wang, San Jose, CA (US); Chao-Tung Yang, Hsinchu (TW); Yi Lu, Hsinchu (TW)

(73) Assignee: MStar Semiconductor, Inc., Hsinchu (TW)

( * ) Notice: Subject to any disclaimer, the term of this patent is extended or adjusted under 35 U.S.C. 154(b) by 1181 days.

(21) Appl. No.: 11/924,280

(22) Filed: Oct. 25, 2007

(65) Prior Publication Data

US 2008/0100753 A1  May 1, 2008

Related U.S. Application Data

(60) Provisional application No. 60/862,978, filed on Oct. 25, 2006.

(51) Int. Cl.
*H04N 5/44* (2011.01)

(52) U.S. Cl. ......... 348/731; 348/725; 348/726; 375/324

(58) Field of Classification Search .......... 348/731–733, 348/725–726; 375/295, 324, 261, 340; 455/154.1, 455/165.1, 189.1, 190.1, 323
See application file for complete search history.

(56) References Cited

U.S. PATENT DOCUMENTS

| | | | |
|---|---|---|---|
| 4,653,117 A | 3/1987 | Heck | |
| 5,737,035 A | 4/1998 | Rotzoll | |
| 5,739,874 A | 4/1998 | Badger | |
| 5,956,075 A | 9/1999 | Matsuo | |
| 6,838,947 B2 * | 1/2005 | Gomez | ............................ 331/17 |
| 7,180,553 B2 * | 2/2007 | Su | ................................. 348/731 |
| 7,212,581 B2 * | 5/2007 | Birkett et al. | .................. 375/295 |
| 7,251,466 B2 * | 7/2007 | Porret et al. | ................. 455/190.1 |
| 7,356,318 B2 * | 4/2008 | Sowlati | ....................... 455/168.1 |
| 7,394,874 B2 * | 7/2008 | Birkett et al. | .................. 375/324 |
| 7,450,185 B2 | 11/2008 | Wu | |
| 7,593,491 B1 * | 9/2009 | Khlat et al. | .................... 375/344 |

(Continued)

FOREIGN PATENT DOCUMENTS

CN    1619970 A    5/2005

(Continued)

OTHER PUBLICATIONS

Mark Dawkins et. al., "A Single-Chip Tuner for DVB-T," IEEE Journal of Solid-State Circuits, vol. 38, No. 8, Aug. 2003.

(Continued)

*Primary Examiner* — Annan Shang
(74) *Attorney, Agent, or Firm* — Kirton McConkie; Evan R. Witt

(57) ABSTRACT

A television tuner employs a single down-conversion architecture to translate VHF/UHF TV signals to various standard IF frequencies. The television tuner includes a harmonic rejection and quadrature mixer and a quadrature mixer. The harmonic rejection and quadrature mixer mixes a first-band signal with a reference signal to output a first pair of in-phase and quadrature-phase signals with a harmonic-frequency component eliminated from the resulting signals. A quadrature mixer mixes a second-band signal with the reference signal to output a second pair of in-phase and quadrature-phase signals. A digital signal processing circuit coupled to both the harmonic rejection and quadrature mixer and the quadrature mixer for selectively processing either the first pair of in-phase and quadrature-phase signals or the second pair of in-phase and quadrature-phase signals to generate an output signal corresponding to a desired channel.

16 Claims, 5 Drawing Sheets

U.S. PATENT DOCUMENTS

| | | | |
|---|---|---|---|
| 7,605,669 B2 * | 10/2009 | Pullela et al. | 331/45 |
| 2004/0125240 A1 * | 7/2004 | Stikvoort et al. | 348/731 |
| 2005/0001937 A1 | 1/2005 | Lee et al. | |
| 2005/0003773 A1 | 1/2005 | Cowley et al. | |
| 2005/0090213 A1 | 4/2005 | Heng et al. | |
| 2005/0117071 A1 | 6/2005 | Johnson | |
| 2005/0164662 A1 | 7/2005 | Tseng et al. | |
| 2006/0001779 A1 | 1/2006 | Favrat et al. | |
| 2006/0078069 A1 * | 4/2006 | Seendripu et al. | 375/316 |
| 2007/0132889 A1 * | 6/2007 | Pan | 348/726 |
| 2007/0140391 A1 | 6/2007 | Pan | |
| 2007/0218850 A1 | 9/2007 | Pan | |

FOREIGN PATENT DOCUMENTS

| | | |
|---|---|---|
| CN | 1798287 A | 7/2006 |
| TW | 315549 | 9/1997 |
| TW | I249348 | 2/2006 |
| TW | I253856 | 4/2006 |
| TW | 200618626 | 6/2006 |
| WO | 2004064246 A1 | 7/2004 |
| WO | 2005091493 A1 | 9/2005 |

OTHER PUBLICATIONS

Jan Van Sinderen et. al., "A 48-80 MHz Digital Cable Tuner IC with Integrated RF and IF selectivity," ISSCC 2003, Session 25.3.

D. Salas et. al., "A 0.12 mm CMOS DVB-T tuner," ISSCC 2005, Session 23.3.

Chun-Huat Heng et. al., "A CMOS TV Tuner/Demodulator IC with Digital Image Rejection," IEEE Journal of solid State Circuits, vol. 40, No. 12, p. 2525, Dec. 2005.

* cited by examiner

SINGLE DOWN-CONVERSION TELEVISION TUNER

CROSS REFERENCE TO RELATED PATENT APPLICATION

This patent application claims the benefit of U.S. provisional patent application No. 60/862,978 filed Oct. 25, 2006.

FIELD OF THE INVENTION

The present invention relates to a television tuner, and more particularly to a television tuner with a single down-conversion architecture for frequency-translating a television signal to a desired IF frequency which facilitates the subsequent demodulation process.

BACKGROUND OF THE INVENTION

In general, the spectrum of a VHF (very high frequency) or UHF (ultra high frequency) radio-frequency television signal lies between 48 MHz and 860 MHz. Within this range, a plurality of channels are covered and each channel is typically allocated with a bandwidth of 6~8 MHz. In NTSC standard, a video carrier frequency positions at 1.25 MHz above the lower-margin of the bandwidth; a color carried frequency positions at 3.58 MHz higher than the video carrier frequency; while an audio carrier frequency positions at 4.5 MHz higher than the video carrier frequency. For example, Channel 2 has a bandwidth of 6 MHz ranged from 54 MHz to 60 MHz. Meanwhile, the video carrier frequency, color carrier frequency and audio carrier frequency position at 55.25 MHz, 58.83 MHz and 59.75 MHz, respectively.

When the radio-frequency television signal having the above-mentioned feature is received by an antenna or a cable and transmitted to the television tuner, the television tuner selects one or more channels accordingly, and converts the associated signal into an intermediate frequency (IF) signal or a base-band frequency signal which are subsequently processed by a demodulator.

In early ages, a conventional CAN tuner includes a mixer for directly down-converting the radio-frequency television signal into an intermediate frequency signal or a base-band frequency signal, as illustrated in FIG. 1. The radio-frequency television signal (I) including a plurality of channels multiplies a reference signal (II) with a reference frequency $f_{LO}$ in the mixer. In this way, a channel A with a frequency band positioned at the reference frequency $f_{LO}$ can be down-converted into a base-band frequency signal.

Applying a switching mixer, the reference signal is a square-wave signal having a 50% duty cycle. A plurality of harmonic frequencies, e.g. 3 $f_{LO}$, 5 $f_{LO}$, 7 $f_{LO}$, etc., coming from the reference signal are also down-converted to the base-band frequency signal together with the reference frequency $f_{LO}$. Channels B, C and D position at the harmonic 3 $f_{LO}$, 5 $f_{LO}$, 7 $f_{LO}$, respectively. In other words, the associated signals of the channels A, B, C and D all appear in the base-band signal (III).

For readily identifying the desired channel A, the signal power of the channel A is supposed to be much higher, for example 30 dB higher than any co-channel interferer to maintain a desirable signal quality. Assuming on a condition that the signal power of either channel B, C or D is adversely 30 dB higher than that of the channel A, a component for providing at least the 60-dB harmonic rejection ratio is required to alleviate possible SNR (signal-to-noise ratio) degradation.

Conventionally, several RF (radio-frequency) tracking filters are utilized to reduce the harmonic power of the radio-frequency television signal prior to the entrance of the radio-frequency television signal into the mixer, in order to solve the above-mentioned harmonic problem.

However, such a tuner is generally bulky due to the incorporation of several discrete electronic devices such as the above-mentioned RF tracking filters, and thus is called as a CAN tuner. Moreover, the RF tracking filters require a high voltage varactor for band tuning. It is thus not only cost-ineffective but also hard to be integrated into a single-chip IC (integrated circuit) for reducing the module footprint.

With remarkable advances of semiconductor technologies to produce highly integrated silicon chips, a television tuner can also be manufactured as a single chip so as to reduce device size and cost. U.S. Pat. No. 5,737,035 discloses such a television tuner and is incorporated herein for reference.

A single-chip television tuner as suggested by U.S. Pat. No. 5,737,035 is illustrated in FIG. 2, wherein an up-down dual conversion tuner with two mixers is used. After a radio-frequency television signal is received by an antenna 402 (or a cable), it is first subjected to a cutoff frequency of, e.g. 900 MHz, an RF lowpass filter 404 to result in a frequency band below 900 MHz. Then the filtered radio-frequency television signal passes through a low-noise transconductance amplifier (LNTA) 406 so as to be amplified with a certain gain, e.g. 20 dB. Subsequently, the amplified radio-frequency television signal is mixed with a first reference signal in a first mixer 408 to output a first intermediate frequency signal. The first intermediate frequency signal is then mixed with a second reference signal in a second mixer 410 to output a second intermediate frequency signal so as to extract a desired channel with a specified carrier frequency.

The first mixer 408 is a subtractive mixer and the first reference signal is generated by a first local oscillator 411 to have an operating frequency tunable in the range between 1200 MHz and 2100 MHz. By adjusting the frequency of the first reference signal, the carrier frequency of a desired channel included in the resulting first intermediate frequency signal can be obtained as 1200 MHz. On the other hand, the second mixer 410 is an image rejection mixer and the second reference signal is generated by a second local oscillator 412 to have an operating frequency of 1180 MHz. With the mixing of the second reference signal, the carrier frequency of the desired channel included in the resulting second intermediate frequency signal can be obtained at 20 MHz, i.e. (1200-1180) MHz. The first mixer 408 up-converts the carrier frequency of the desired channel to 1200 MHz to minimize harmonic effects, and then the second mixer 410 down-converts the carrier frequency of the desired channel to 20MHz.

This tuner rejects signal energy in the first intermediate frequency signal that is in the area of 1160 MHz, which would also yield |1160-1180|=20 MHz. FIG. 3 illustrates another up-down dual conversion tuner similar to the tuner of FIG. 2 but further including an IF filter 409 between the mixers 408 and 410 to reject the image frequency component 1160 MHz from the first intermediate frequency signal.

The above-mentioned single-chip television tuners use a reference signal with a tunable frequency and another reference signal with a fixed frequency to mix the radio-frequency television signal to obtain the carrier frequency of the desired channel. In order to adjust the frequency of the first reference signal in a relatively wide range, a plurality of voltage controlled oscillators (VCOs) are needed and that results in higher circuit complexity and chip size.

SUMMARY OF THE INVENTION

Therefore, the present invention suggests a novel television tuner architecture with reduced device size and cost compared to conventional CAN tuners.

The present invention provides a miniaturized single-conversion television tuner to frequency-translating a television signal.

The television tuner according to the present invention includes a low pass filter for extracting a first-band signal from the television signal; a high pass filter disposed in parallel to the low pass filter for extracting a second-band signal from the television signal; a local oscillator generating a reference signal having a frequency tunable depending on a desired channel; a harmonic rejection and quadrature mixer coupled to the low pass filter for processing the first-band signal with the reference signal to output a first pair of in-phase and quadrature-phase signals with a harmonic-frequency component eliminated from the resulting signals; a quadrature mixer coupled to the high pass filter for processing the second-band signal with the reference signal to output a second pair of in-phase and quadrature-phase signals; and a digital signal processing circuit coupled to both the harmonic rejection and quadrature mixer and the quadrature mixer for selectively processing either the first pair of in-phase and quadrature-phase signals or the second pair of in-phase and quadrature-phase signals to generate an output signal corresponding to the desired channel.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
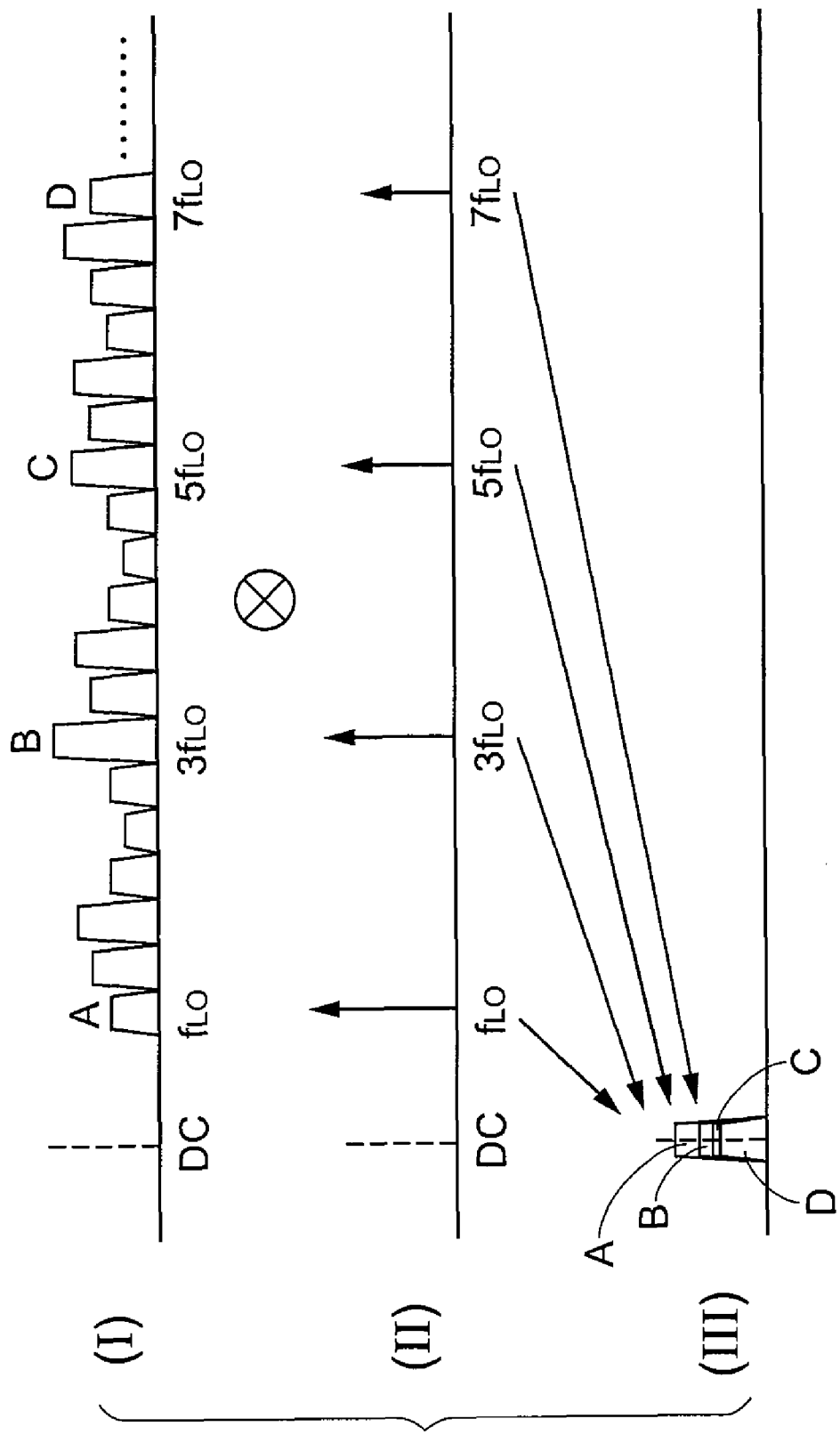
FIG. 1 is a schematic diagram showing a traditional single conversion operation.
Figure 2:
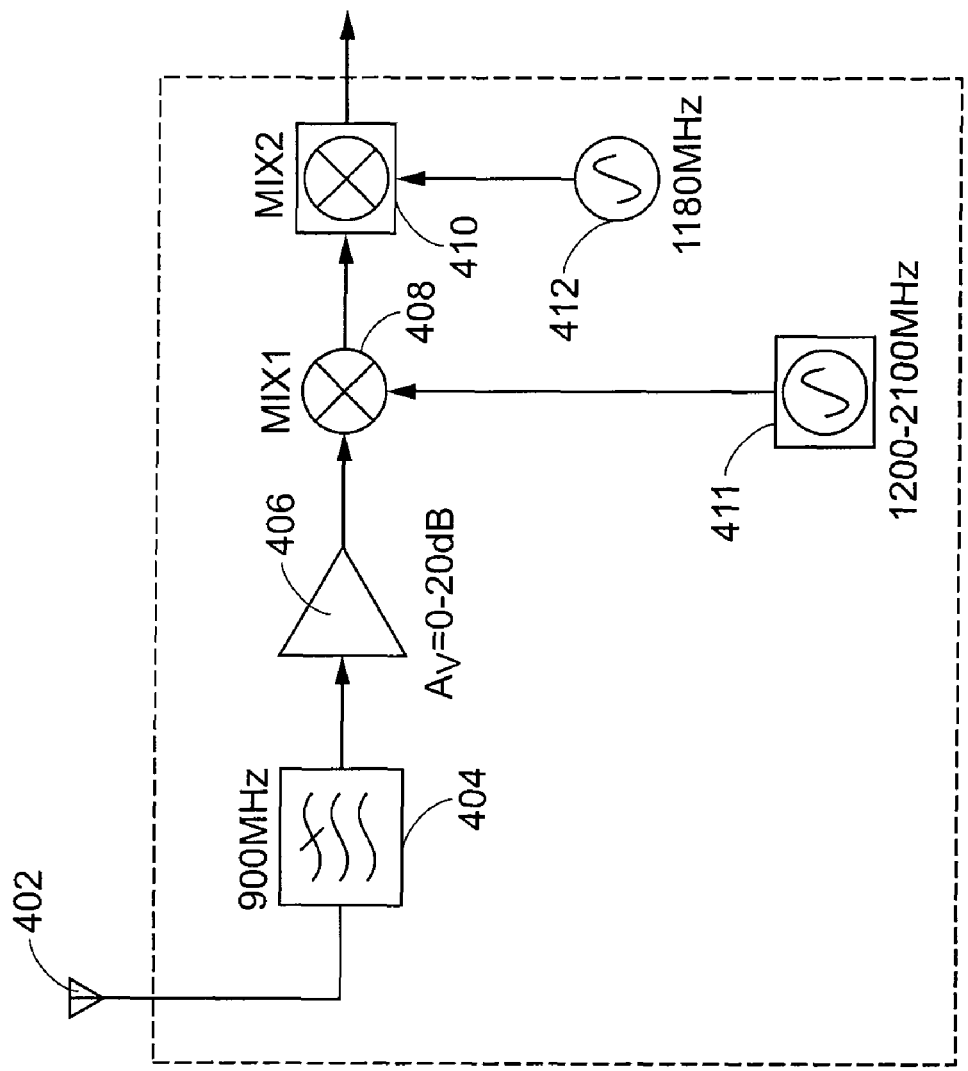
FIG. 2 is a circuit block diagram schematically illustrating a conventional dual conversion television tuner.
Figure 3:
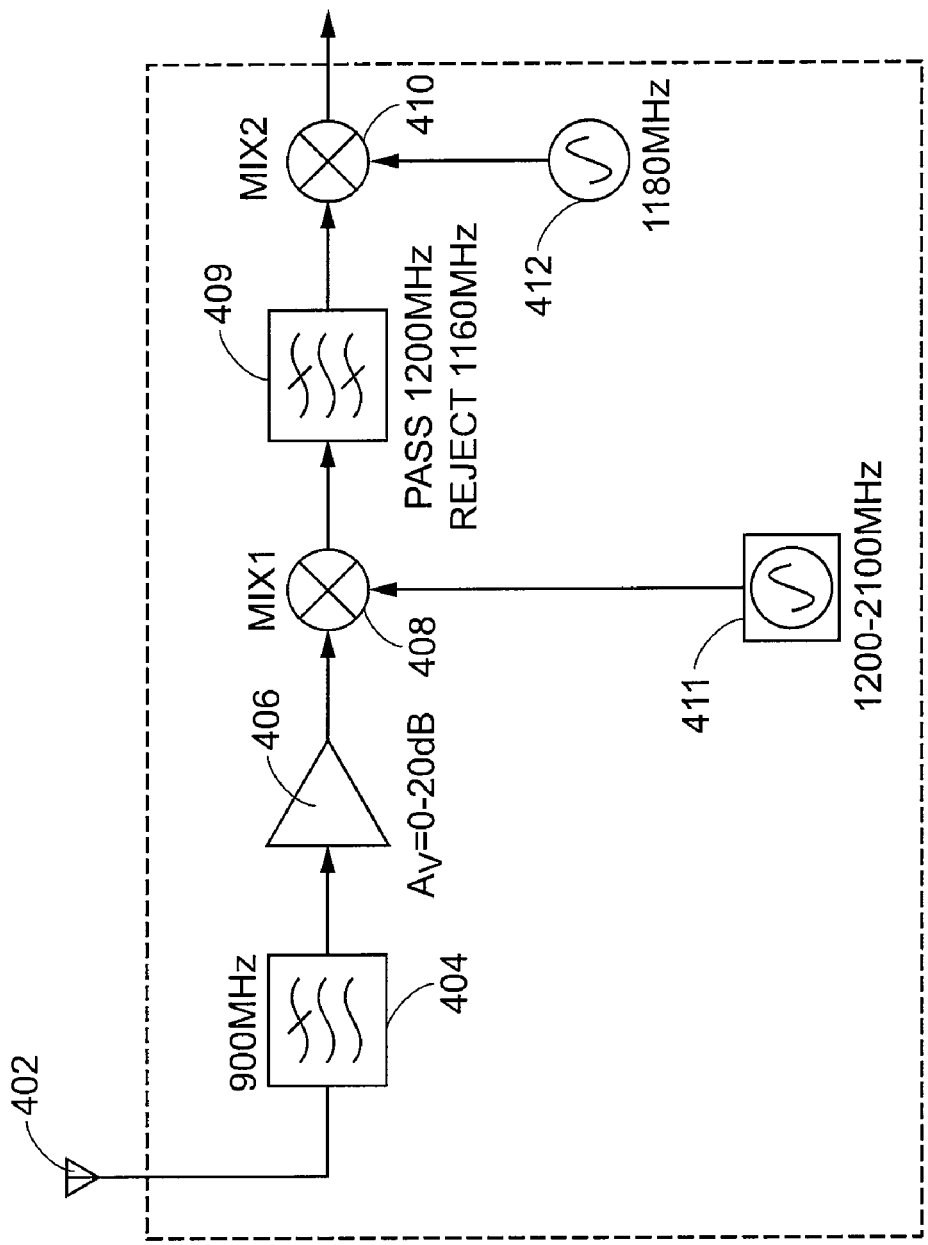
FIG. 3 is a circuit block diagram schematically illustrating another conventional dual conversion television tuner.
Figure 4:
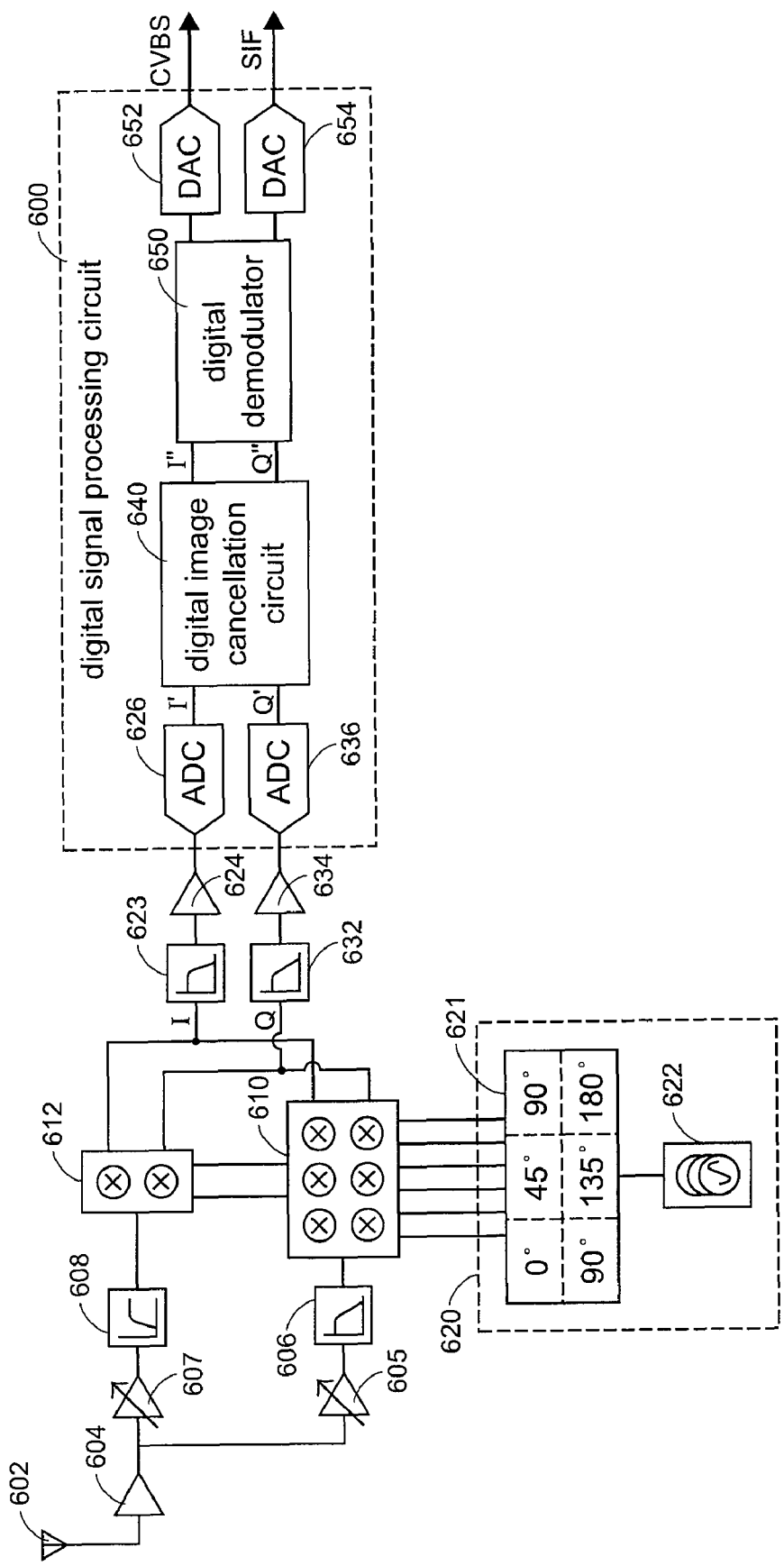
FIG. 4 is a circuit block diagram schematically illustrating a single down-conversion television tuner according to an embodiment of the present invention.

Please refer to FIG. 4. A television tuner according to an embodiment of the present invention is illustrated. The television tuner employs a single down-conversion architecture and includes a low pass filter 606 for extracting a first frequency band from the input television signal to generate a first-band signal, a high pass filter 608 for extracting a second frequency band from the input television signal to generate a second-band signal, a local oscillator 620 for generating a reference signal, a harmonic rejection and quadrature mixer 610 for mixing the first-band signal with the reference signal to output a first pair of in-phase and quadrature-phase signals, a quadrature mixer 612 for mixing the second-band signal with the reference signal to output a second pair of in-phase and quadrature-phase signals, and a digital signal processing circuit 600 for processing the output of the harmonic rejection and quadrature mixer 610 or the output of quadrature mixer 612 to generate an analog-TV composite video broadcast signal (CVBS) and an analog-TV sound intermediate frequency (SIF) signal.

The radio-frequency (RF) television signal, after being received from an antenna 602 (or a cable), is passed through a low-noise amplifier 604 and then variable gain amplifiers 605 and 607 disposed in parallel to be amplified. Then the RF signal is filtered by the low pass filter 606 to obtain the first-band signal and filtered by the high pass filter 608 to obtain the second-band signal. For example, the first-band signal has a frequency range between 48 MHz and 450 MHz, while the second-band signal has a frequency range between 450 MHz and 860 MHz. Accordingly, if a desired channel lies within the first-band signal, the television tuner selects the first-band signal for subsequent processing. On the contrary, if a desired channel lies within the second-band signal, the television tuner selects the second-band signal for subsequent processing.

Assume that the first-band signal is selected. The first-band signal is inputted to the harmonic rejection and quadrature mixer 610 to be mixed with the reference signal generated by the local oscillator 620, thereby generating an in-phase signal I and a quadrature-phase signal Q to down-convert a carrier frequency of the desired channel to an IF frequency.

Since the first-band reference signal has a relatively low frequency $f_0$, its higher-order harmonic frequencies, e.g. $3f_0$, $5f_0$, $7f_0$, etc., may occur and take in part of the mixing operation of the first-band signal. Therefore, the harmonic rejection and quadrature mixer 610 is employed to eliminate higher-order harmonic components. In addition to harmonic rejection, image rejection is also an issue. Therefore, the downstream digital signal processing circuit 600 is employed for image rejection.

The local oscillator 620 for generating the reference signal includes a voltage controlled oscillator (VCO) set 622 and a processing circuit 621. The VCO set 622 generates an oscillating signal with a tunable frequency. For example, the processing circuit 621 includes a frequency divider and a polyphase signal generator, which divides the oscillating signal by four to obtain the reference signal. The reference signal includes five tones having the same frequency but with different phases at 0°, 45°, 90°, 135° and 180°, respectively. Using the 0°, 45° and 90° signals, the harmonic rejection of the in-phase signal I can be performed, while using the 90°, 135° and 180° signals, the harmonic rejection of the quadrature-phase signal Q can be performed.

On the other hand, assume that the second-band signal is selected. The second-band signal is inputted to the quadrature mixer 612 to be mixed with the reference signal generated by the local oscillator 620, thereby generating another pair of in-phase signal I and quadrature-phase signal Q with a carrier frequency of the desired channel down-converted to an IF frequency.

Since the second-band reference signal has a relatively high frequency $f_0$, its higher-order harmonic frequencies, e.g. $3f_0$, $5f_0$, $7f_0$, etc., which may accompany the reference signal, are supposed to exceed the frequency range of the television signal band. Therefore, the harmonic rejection function can be omitted from the mixer 612, and thus a quadrature mixer 612 is used. Nevertheless, image rejection is still required and will be executed by the downstream digital signal processing circuit 600. Under this circumstance, the reference signal includes two signals with the same frequency and different phases at 0° and 90° to be mixed with the second-band signal to generate the pair of in-phase signal I and quadrature-phase signal Q.

After the in-phase signal I and quadrature-phase signal Q are generated, either by the harmonic rejection and quadrature mixer 610 or the quadrature mixer 612, the in-phase signal I is optionally passed through a low pass filter 623 and a variable gain amplifier 624 to be amplified, and then converted into a digital in-phase signal I' through an analog-to-digital converter (ADC) 626. Likewise, the quadrature-phase signal Q is optionally passed through a low pass filter 632 and a variable gain amplifier 634 to be amplified, and then converted into a digital quadrature-phase signal Q' through an analog-to-digital converter (ADC) 636.

Afterwards, a digital image cancellation circuit 640 is used to eliminate the image-frequency component from the digital in-phase signal I' and digital quadrature-phase signal Q' by way of digital processing means. A digital demodulator 650 then demodulates the outputs of the digital image cancellation circuit 640 into the composite video broadcast signal (CVBS), which is further converted into an analog-TV CVBS signal through a digital-to-analog converter 652. Meanwhile, the digital demodulator 650 further demodulates the outputs of the digital image cancellation circuit 640 into the sound intermediate frequency (SIF) signal, which is further converted into an analog-TV SIF signal through a digital-to-analog converter 654. Both of the analog-TV CVBS signal and analog-TV SIF signal are provided for an analog television.

Figure 5:
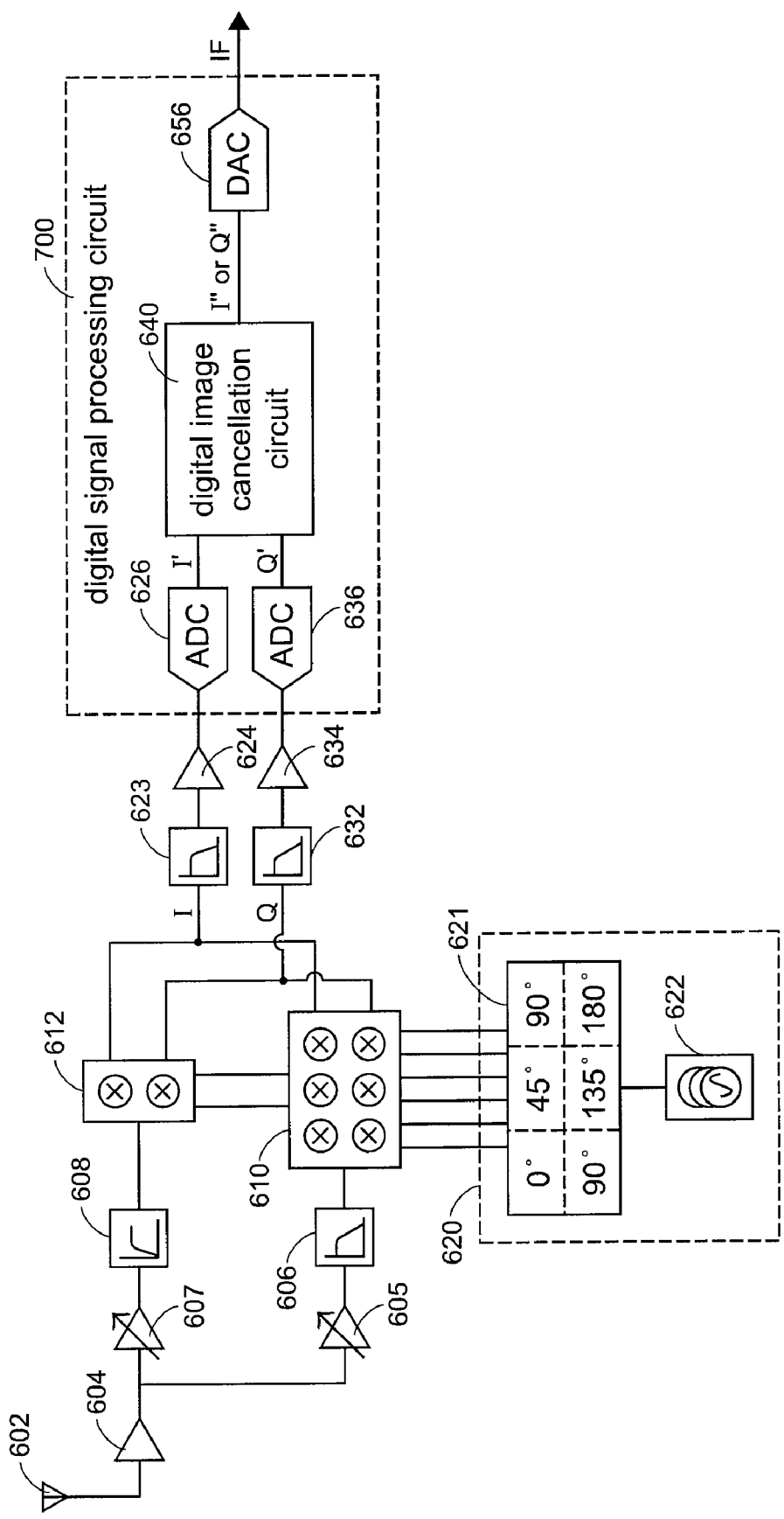
FIG. 5 is a circuit block diagram schematically illustrating a single down-conversion television tuner according to another embodiment of the present invention.

FIG. 5 illustrates a television tuner according to another embodiment of the present invention. The television tuner is a single down-conversion tuner and includes a low-noise amplifier 604, variable gain amplifiers 605 and 607, a low pass filter 606, a high pass filter 608, a local oscillator 620, a harmonic rejection and quadrature mixer 610, a quadrature mixer 612, additional low pass filters 623 and 632, and additional variable gain amplifiers 624 and 634, which are similar to those described in the embodiment of FIG. 4, but a digital signal processing circuit 700 for processing the output of the harmonic rejection and quadrature mixer or the output of quadrature mixer to generate and provide an analog intermediate frequency (IF) signal for a digital TV.

The digital signal processing circuit 700 includes analog-to-digital converters 626 and 636 for converting the in-phase signal I and quadrature-phase signal Q into digital in-phase signal I' and digital quadrature-phase signal Q', respectively. The digital in-phase signal I' and digital quadrature-phase signal Q' are then subjected to image rejection operation to eliminate undesired image-frequency components by a digital image cancellation circuit 640. Subsequently, either the digital in-phase signal I" or digital quadrature-phase signal Q" outputted by the digital image cancellation circuit 640 is converted into an analog IF signal through a digital-to-analog converter 656. The analog IF signal, if being single ended, can be further converted to a differential IF signals IF+ and IF− by an additional single-to-differential converter to be provided for a digital television system.

It is understood that the television tuner according to the present invention, even though implemented with a single-conversion architecture, does not require any bulky devices as a CAN tuner does. Therefore, it is feasible to integrate the present television tuner into a single-chip IC.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A television tuner for frequency-translating a television signal, comprising:
    a low pass filter for extracting a first-band signal from the television signal;
    a high pass filter disposed in parallel to the low pass filter for extracting a second-band signal from the television signal;
    a local oscillator generating a reference signal having a frequency tunable depending on a desired channel;
    a harmonic rejection and quadrature mixer coupled to the low pass filter for mixing the first-band signal with the reference signal to output a first pair of in-phase and quadrature-phase signals while eliminating a harmonic-frequency component from the first pair of in-phase and quadrature-phase signals;
    a quadrature mixer coupled to the high pass filter for mixing the second-band signal with the reference signal to output a second pair of in-phase and quadrature-phase signals; and
    a digital signal processing circuit coupled to both the harmonic rejection and quadrature mixer and the quadrature mixer for selectively mixing either the first pair of in-phase and quadrature-phase signals or the second pair of in-phase and quadrature-phase signals to generate an output signal corresponding to the desired channel.

2. The television tuner according to claim 1 further comprising a low-noise amplifier upstream of the low pass filter and high pass filter for amplifying the television signal.

3. The television tuner according to claim 1 further comprising:
    a first variable gain amplifier disposed between the low pass filter and the harmonic rejection and quadrature mixer for amplifying the first-band signal; and
    a second variable gain amplifier disposed between the high pass filter and the quadrature mixer for amplifying the second-band signal.

4. The television tuner according to claim 1 further comprising a pair of low pass filters disposed downstream of the harmonic rejection and quadrature mixer and the quadrature mixer and upstream of the digital signal processing circuit for respectively filtering the first pair of in-phase signal and quadrature-phase signal or respectively filtering the second pair of in-phase signal and quadrature-phase signal.

5. The television tuner according to claim 1 further comprising a pair of amplifiers disposed downstream of the harmonic rejection and quadrature mixer and the quadrature mixer and upstream of the digital signal processing circuit for respectively amplifying the first pair of in-phase signal and quadrature-phase signal or respectively amplifying the second pair of in-phase signal and quadrature-phase signal.

6. The television tuner according to claim 1 wherein the digital signal processing circuit includes:
    a first digital circuit for generating a third pair of in-phase and quadrature-phase signals according to the first pair of in-phase and quadrature-phase signals or the second pair of in-phase and quadrature-phase signals while eliminating an image-frequency component from the third pair of in-phase and quadrature-phase signals; and
    a second digital circuit coupled to the first digital circuit for processing the third pair of in-phase and quadrature-phase signals into the output signal.

7. The television tuner according to claim 6 wherein the first digital circuit includes:

a pair of analog-to-digital converters for respectively converting the first pair of in-phase signal and quadrature-phase signal or second pair of in-phase signal and quadrature-phase signal into digital signals; and a digital image cancellation circuit for eliminating the image-frequency component from the digital signals.

8. The television tuner according to claim 6 wherein the second digital circuit includes:

a digital demodulator for demodulating the third pair of in-phase and quadrature-phase signals; and a pair of digital-to-analog converters coupled to the digital demodulator for converting the demodulated third pair of in-phase and quadrature-phase signals into an analog-TV composite video broadcast signal (CVBS) and an analog-TV sound intermediate frequency (SIF) signal.

9. The television tuner according to claim 6 wherein the analog-TV composite video broadcast signal (CVBS) and analog-TV sound intermediate frequency (SIF) signal are provided for an analog television system.

10. The television tuner according to claim 6 wherein the second digital circuit includes a digital-to-analog converter for receiving the third pair of in-phase and quadrature-phase signals and converting either the in-phase signal or quadrature-phase signal into an analog intermediate frequency (IF) signal.

11. The television tuner according to claim 10 wherein the analog intermediate frequency (IF) signal is provided for a digital television system.

12. The television tuner according to claim 10 wherein the analog intermediate frequency (IF) signal is an analog single-ended IF signal or an analog differential IF signal.

13. The television tuner according to claim 1 wherein the local oscillator includes:

a voltage controlled oscillator (VCO) set for generating an oscillating signal with a tunable frequency; and a processing circuit coupled to the VCO set for dividing the oscillating signal to generate the reference signal.

14. The television tuner according to claim 1 wherein the reference signal includes a plurality of signals having the same frequency but with different phases.

15. The television tuner according to claim 1 wherein the plurality of signals have phase differences at 0°, 45°, 90°, 135° and 180°.

16. The television tuner according to claim 15 wherein the signals having the phase differences at 0°, 45° and 90° are used by the harmonic rejection and quadrature mixer to eliminate the harmonic-frequency component from the in-phase signal, and the signals having the phase differences 90°, 135° and 180° are used by the harmonic rejection and quadrature mixer to eliminate the harmonic-frequency component from the quadrature-phase signal.

* * * * *